(12) United States Patent
Sasaki

(10) Patent No.: US 10,089,485 B2
(45) Date of Patent: Oct. 2, 2018

(54) MOBILE DEVICE, INFORMATION MANAGEMENT SYSTEM AND STORAGE MEDIUM

(71) Applicant: I3 SYSTEMS, INC., Fukuoka, Fukuoka (JP)

(72) Inventor: Tsutomu Sasaki, Fukuoka (JP)

(73) Assignee: I3 SYSTEMS, INC., Fukuoka (JP)

( * ) Notice: Subject to any disclaimer, the term of this patent is extended or adjusted under 35 U.S.C. 154(b) by 216 days.

(21) Appl. No.: 14/773,922

(22) PCT Filed: Mar. 20, 2014

(86) PCT No.: PCT/JP2014/057677
§ 371 (c)(1),
(2) Date: Sep. 9, 2015

(87) PCT Pub. No.: WO2014/148593
PCT Pub. Date: Sep. 25, 2014

(65) Prior Publication Data
US 2016/0034699 A1    Feb. 4, 2016

(30) Foreign Application Priority Data

Mar. 22, 2013 (JP) .................. 2013-059370

(51) Int. Cl.
*H04L 29/00* (2006.01)
*G06F 21/62* (2013.01)
(Continued)

(52) U.S. Cl.
CPC .......... *G06F 21/6218* (2013.01); *H04W 4/02* (2013.01); *H04W 4/021* (2013.01); *H04W 64/00* (2013.01); *H04W 12/04* (2013.01); *H04W 88/02* (2013.01)

(58) Field of Classification Search
CPC ...... G06F 21/6218; H04W 4/02; H04W 4/021
(Continued)

(56) References Cited

U.S. PATENT DOCUMENTS 8,332,494 B2   12/2012  Sakai
8,643,466 B2   2/2014   Park et al.
(Continued)

FOREIGN PATENT DOCUMENTS

CN   101098361 A   1/2008
CN   102348012 A   2/2012
(Continued)

OTHER PUBLICATIONS

Fukuda, "Close Up", No. 819, Nikkei Computer, Japan, Nikkei Business Publications,Inc., Oct. 11, 2012, with English translation, Cited in Office Action dated Jan. 13, 2015 (10 pages).
(Continued)

*Primary Examiner* — Jeffrey C Pwu
*Assistant Examiner* — Michael D Anderson
(74) *Attorney, Agent, or Firm* — Westerman, Hattori, Daniels & Adrian, LLP

(57) ABSTRACT

A location information acquisition unit (25) acquires location information for pointing a current location. A first transmission unit (21) sends, via a network to a management device (100), access request information used for requesting access to information acquisition units (23), (24), attached with the location information acquired by the location information acquisition unit (25). A first reception unit (22) receives, from the management device (100) via the network, access permission information or access prohibition information in response to the access request information. A control unit (20) leaves the information acquisition units (23), (24) prohibited to operate, if the access permission information has not been received yet by the first reception
(Continued)

unit (22), and controls the information acquisition units (23), (24) to operate only for a predetermined duration to acquire information, upon reception of the access permission information by the first reception unit (22).

16 Claims, 5 Drawing Sheets

(51) Int. Cl.
  *H04W 64/00* (2009.01)
  *H04W 4/02* (2018.01)
  *H04W 4/021* (2018.01)
  *H04W 12/04* (2009.01)
  *H04W 88/02* (2009.01)

(58) Field of Classification Search
  USPC .......................................................... 726/27
  See application file for complete search history.

(56) References Cited

U.S. PATENT DOCUMENTS

| 2005/0093692 | A1 | 5/2005 | Nakaguma et al. | |
| 2009/0216865 | A1* | 8/2009 | Sakai | G06F 3/1203 709/221 |
| 2010/0037088 | A1 | 2/2010 | Krivopaltsev et al. | |
| 2010/0066486 | A1 | 3/2010 | Park et al. | |
| 2010/0317336 | A1 | 12/2010 | Ferren et al. | |
| 2014/0187207 | A1* | 7/2014 | Slack | G06F 9/4843 455/411 |

FOREIGN PATENT DOCUMENTS

| JP | 2003-204384 A | 7/2003 |
| JP | 2005-142690 A | 6/2005 |
| JP | 2005-258990 A | 9/2005 |
| JP | 2006-13980 A | 1/2006 |
| JP | 2006-180277 A | 7/2006 |
| JP | 2007-282017 A | 10/2007 |
| JP | 2008-312009 A | 12/2008 |
| JP | 2010-205185 A | 9/2010 |
| JP | 2011-530860 A | 12/2011 |
| KR | 20040043341 A | 5/2004 |
| KR | 20100031230 A | 3/2010 |

OTHER PUBLICATIONS

Extended European Search Report dated Aug. 29, 2016, issued in counterpart Application No. 14768431.0. (5 pages).
Office Action dated May 18, 2017, issued in Korean Patent Application No. 2015-7025987, with Machine translation.
Fukuda, "Close Up", No. 819, Nikkei Computer, Japan, Nikkei Business Publications,Inc., Oct. 11, 2012, with English translation, Cited in Office Action dated Jun. 16, 2015 (10 pages).
Office Action dated Jun. 16, 2015, issued in counterpart Japanese Patent Application No. 2015-035659 (3 pages).
Office Action dated Jan. 13, 2015, issued in counterpart Japanese Patent Application No. 2013-059370 (1 pages).
Decision to Grant a Patent dated Aug. 11, 2015, issued in counterpart Japanese Patent Application No. 2015-035659 (1 page).
Decision to Grant a Patent dated Feb. 17, 2015, issued in counterpart Japanese Patent Application No. 2013-059370 (1 page).
International Search Report dated Jun. 24, 2014, issued in counterpart Application No. PCTJP2014/057677 (1 page).
Office Action dated Jan. 3, 2018, issued in Chinese Patent Application No. 201480017568.2, with translation.

* cited by examiner

MOBILE DEVICE, INFORMATION MANAGEMENT SYSTEM AND STORAGE MEDIUM

TECHNICAL FIELD

This invention relates to a mobile device, an information management system, an information management device, an information management method, a program product and a storage medium.

BACKGROUND ART

In recent years, mobile devices exemplified by smartphone, tablet terminal and PDA (Personal Digital Assistant) have been diversified in function. There are increasing lineups of mobile devices functionalized not only for telephone call and mailing, but also functionalized, as standard, for scheduling, camera, and various sensors. In business use of mobile device, the mobile devices may be provided by an organization such as company to the employees, but it has widely been conventionalized that the mobile devices personally owned by the employees are put into business use. Use of the personally-owned mobile devices not only for private purpose but also for business purpose is referred to as BYOD (Bring Your Own Device).

On the other hand, leakage of information through the mobile devices is becoming a problem. Examples of the problem include information leakage of confidential documents or facilities in the form of image acquired by the camera function, storage of files attached to business mails into a cloud service for personal use, and transfer of data of an address book for business use. In particular, standard installation of the camera function on the mobile devices has accelerated the risk of such information leakage. There has therefore been proposed inventions to prevent information leakage using the camera function.

According to a system of Patent Literature 1, a mobile device, with its camera device powered on, sends an imaging enable signal from the mobile device to a server at predetermined time intervals, and the server detects the location of the mobile device based on the signal. When the server receives the imaging enable signal from the mobile device which resides in an imaging prohibition zone, the server activates a secret photographing prevention device of the mobile device. The secret photographing prevention device is a notification means using alarm or sound, a lock-and-key device, a means for reporting to a security guard, and so forth.

A system described in Patent Literature 2 is an operation control system which opens an entrance-exit gate, upon reception of a signal indicating that the camera function of the mobile device has been disabled.

CITATION LIST

Patent Literature

[Patent Literature 1] JP-A-2008-312009
[Patent Literature 2] JP-A-2005-258990

SUMMARY OF THE INVENTION

Technical Problem

The system of Patent Literature 1 inconveniently activates the secret photographing prevention device simply when the camera device is powered on, even without an intention of photographing. It is also disadvantageous in terms of power consumption and communication load, since the imaging enable signal is constantly transmitted at predetermined time intervals, even when the mobile device is in the imaging permission zone.

The system of Patent Literature 2 needs installation of a special entrance-exit gate to all of necessary locations, which is feasible only with difficulty.

The information leakage can occur not only through acquisition of image by camera, but also through sound recording or other applications. Other possibilities of information leakage widely reside in viewing of business schedule management data outside the office, and personal storage of business mail or the attached files. Besides the information leakage, various problems can occur as a result of personal accessibility to various applications which are company's assets, such as business applications using various sensor functions, installed on the mobile device. These problems can occur not only when a personally owned mobile device is used in BYOD, but also when company owned mobile devices are provided to the employees to allow them to use for business purpose and private purpose.

This invention is made in consideration of the problems described above, and is to provide a mobile device, an information management system, an information management device, an information management method, a program product and a storage medium, all intended for preventing information leakage and other problems due to coexistence of business use and personal use of the mobile device, without sacrificing its convenience.

Solution to Problem

According to this invention, there is provided a mobile device connected via a network to an information management device, the mobile device includes: a reception means which receives information via the network from the information management device; a control means which leaves a part of a plurality of function units possessed by the mobile device prohibited to operate; and a location information acquisition means which acquires the location information for pointing a current location. The reception means receives access permission information, used for unlocking operation of the function unit having been prohibited by the control means, from the information management device via the network. The control means controls the function unit so as to operate only for a predetermined duration, based on the location information and the access permission information.

According to this invention, there is also provided an information management system which includes a mobile device and an information management device connected to each other via a network. The mobile device includes: a reception means which receives information via the network from the information management device; a plurality of function units; a control means which leaves a part of the plurality of function units prohibited to operate; and a location information acquisition means which acquires the location information for pointing a current location. The information management device includes a transmission means which sends, to the mobile device via the network, access permission information used for unlocking operation of the function unit having been prohibited by the control means. The control means unlocks the prohibition of operation of the function unit, and allows the function unit to operate only for a predetermined duration, based on the location information acquired by the location information acquisition means, and the access permission information sent from the information management device to the mobile device.

According to this invention, there is also provided an information management device connected via a network to a mobile device equipped with a function unit. The information management device includes: a reception means which receives, from the mobile device, access request information attached with location information for pointing a current location; a storage means which stores at least either permission zone information used for permitting access to the function unit, or prohibition zone information used for prohibiting access to the function unit; a propriety determination means which determines whether the function unit possessed by the mobile device is permitted to operate or not, based on the location information attached to the access request information, referring to at least either the permission zone information or the prohibition zone information stored in the storage means; and a transmission means which sends access permission information to the mobile device via the network, when the propriety determination means determined to permit the function unit to operate.

According to this invention, there is also provided an information management method implemented by using a mobile device and an information management device which are connected to each other via a network. The method includes: a location information acquisition step, acquiring location information for pointing a current location of the mobile device; an access request information sending step, attaching the location information to access request information used for requesting access to a function unit provided to the mobile device, and sending them via the network to the information management device; an access request information reception step, receiving the access request information from the mobile device by the information management device; a propriety determination step, determining by the information management device, whether the function unit provided to the mobile device is permitted to operate or not, based on the location information attached to the access request information, received in the access request information reception step; an access permission information sending step, sending access permission information if a determination was made in the propriety determination step so as to permit the function unit to operate, from the information management device to the mobile device via the network; an access permission information reception step, receiving by mobile device from the information management device via the network, the access permission information in response to the access request information; and a control step, leaving the function unit possessed by the mobile device prohibited to operate, if the access permission information has not been received yet, and controls the function unit so as to operate only for a predetermined duration to acquire information, upon reception of the access permission information.

According to this invention, there is provided a program product used for information management using a computer of a mobile device, the mobile device being connected via a network to an information management device, and being equipped with a function unit. The program product makes the computer execute: a location information acquisition process, acquiring location information for pointing a current location; a sending process, sending access request information attached with the location information, used for requesting access to the function unit, via the network to the information management device; a reception process, receiving access permission information or access prohibition information in response to the access request information, from the information management device via the network; and a control process, leaving the function unit prohibited to operate if the access permission information has not been received yet, and controlling the function unit so as to operate only for a predetermined duration upon reception of the access permission information.

According to this invention, there is also provided a storage medium storing a program product recorded so as to be readable by a computer of a mobile device, the mobile device being connected via a network to an information management device, and being equipped with a function unit. The program product makes the computer execute: a location information acquisition process, acquiring location information for pointing a current location; a sending process, sending access request information attached with the location information, used for requesting access to the function unit, via the network to the information management device; a reception process, receiving access permission information or access prohibition information in response to the access request information, from the information management device via the network; and a control process, leaving the function unit prohibited to operate if the access permission information has not been received yet, and controlling the function unit so as to operate only for a predetermined duration upon reception of the access permission information.

Effects of Invention

According to this invention, information leakage and other problems, due to coexistence of business use and private use of a mobile device, may be prevented without sacrificing the convenience of the mobile device.

BRIEF DESCRIPTION OF DRAWINGS

The above and other objects, features and advantages of this invention will be more apparent from the following description of certain preferred embodiments taken in conjunction with the accompanying drawings.

DESCRIPTION OF EMBODIMENTS

Figure 1:
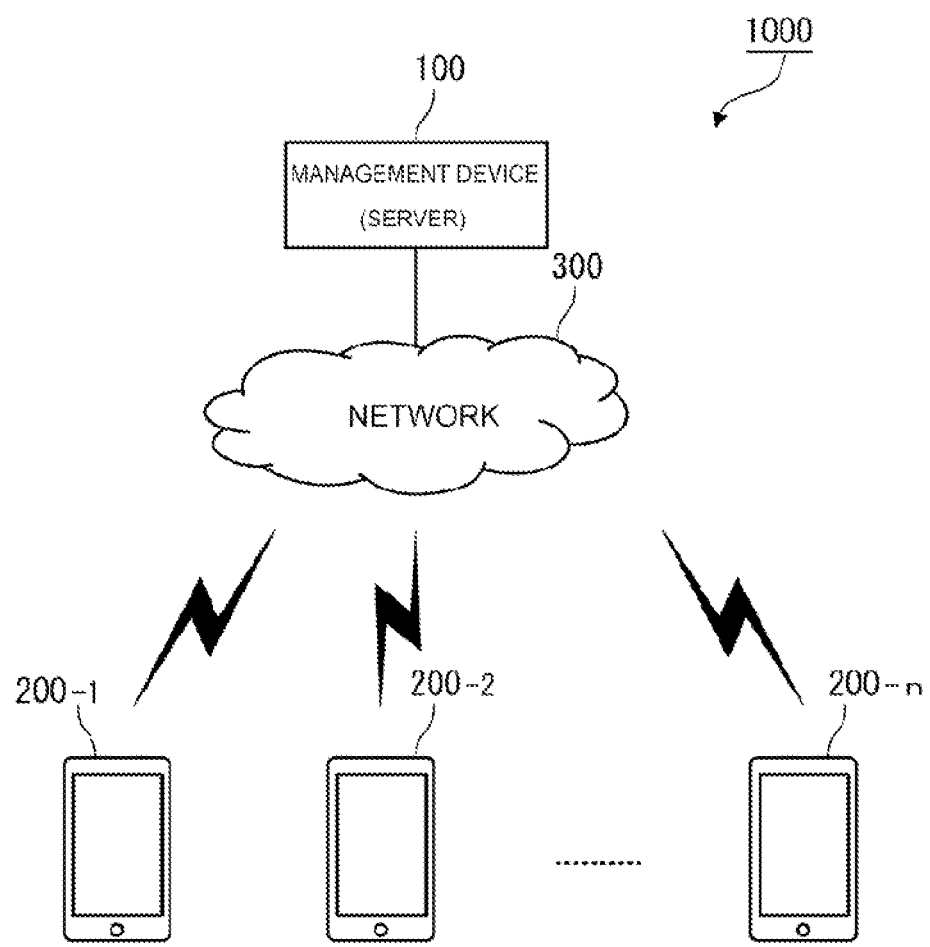
FIG. 1 A block diagram illustrating a configuration of a confidential information management system according to an embodiment of this invention.

Embodiments of this invention will now be explained referring to the attached drawings. In all drawings, all similar constituents will be given the same reference signs to occasionally avoid repetitive explanation.

First, the information management system of this embodiment will be outlined.

An information management system 1000 of this embodiment is configured by mobile devices (mobile terminals) 200 and an information management device (server) 100 which are connected via a network 300. In the information management system 1000 of this embodiment, each mobile device 200 has a reception unit (first reception unit) 22 which receives information via the network 300 from the information management device (server) 100, a plurality of function units, a control unit 20 which leaves a part of the plurality of function units prohibited to operate, and a location information acquisition unit 25 which acquires the location information for pointing a current location. The mobile device 200 also has a transmission unit (first transmission unit) 21 and a reception unit (first reception unit) 22.

The function unit is exemplified by, as illustrated in FIG. 2, an imaging unit 23 and a sound recording unit 24 as information acquisition units, and also by a mailing function unit 27, a network connection unit 28, a sensor function unit 29 and a general-purpose function unit 30, but not limited thereto. Hereinafter, the imaging unit 23 and the sound recording unit 24 will occasionally be referred to as information acquisition units 23, 24 collectively. The information acquisition units 23, 24, the mailing function unit 27, the network connection unit 28 and the sensor function unit 29 are exemplified as function units which execute business applications. The general function unit 30 is exemplified as a function unit which executes private applications.

In the information management system 1000 of this embodiment, while leaving the general function unit 30 operable, any one or more of the information acquisition units 23, 24, the mailing function unit 27, the network connection unit 28 and the sensor function unit 29, which execute business applications, are once prohibited to operate. Under such situation, if the mobile device 200 resides at a location, such as business site of company, where the above-described function units should be made operable in the mobile device 200, the prohibition of operations of the function units is unlocked. The information management system 1000 of this embodiment unlocks the prohibition of various operations of the function units remained prohibited by the control unit 20, based on the location information of the mobile device 200, and allows the function units to operate only a predetermined duration.

Note, alternatively to this embodiment, that it is also possible to once prohibit the operations of the general function unit 30 which executes private applications, and to leave the information acquisition units 23, 24, the mailing function unit 27, the network connection unit 28 or the sensor function unit 29, which execute business applications, operable. The prohibition of the operations of the general function unit 30 may be unlocked, when the current location of the mobile device 200 is pointed by a predetermined location information. In this way, when a privately-owned mobile device is put into business use, and even if some private application were infected by a computer virus, such computer virus is blocked from entering the business network, by leaving the operations of the general function unit 30 prohibited as a rule.

In this embodiment, the location information of the mobile device 200 is acquired by the user of the mobile device 200 using the location information acquisition unit 25, and sent to a management device 100. Alternatively to this mode, it is also possible to once record the location information in the mobile device 200, and to collate the location information with the access permission information received from the management device 100 (these two modes are collectively referred to as "access permission request mode"). Still alternatively, in addition to the access permission request mode, the information management system 1000 may determine the location of the mobile device 200, and may automatically unlock the prohibition of operation of the relevant function unit, without accepting the request from the user. Still alternatively, for a special part of the users, identification information such as identification numbers which indicate such users combined with passwords, or bio-information (biometrics) may be sent from the mobile device 200 to the management device 100 for collation, to thereby unlock the prohibition of operation of the relevant functional unit.

Specific processes of the information management system 1000 will now be explained below, referring to the information acquisition units 23, 24 out of all function units.

The information acquisition units 23, 24 are means for acquiring external information around the mobile device 200. The information is exemplified by visual data (still image or movie) or audible data (sound). The location information acquisition unit 25 acquires the location information for pointing a current location. The first transmission means 21 sends, via the network 300 to the management device 100, access request information, which is attached with location information acquired by the location information acquisition unit 25, and is used for requesting access to the information acquisition units 23, 24. The first reception unit 22 receives, from the management device 100 via the network 300, access permission information or access prohibition information in response to the access request information.

The control unit 20 leaves the information acquisition units 23, 24 prohibited to operate, if the access permission information has not been received yet by the first reception unit 22. The control unit 20 controls the information acquisition units 23, 24 to operate only for a predetermined duration to acquire information, upon reception of the access permission information by the first reception unit 22.

The management device 100 has a transmission unit (second transmission unit 15) which sends, to the mobile device 200 via the network 300, the access permission information used for unlocking operation of the function unit (information acquisition units 23, 24) having been prohibited by the control unit 20.

The control unit 20 unlocks the prohibition of operations of the function units (information acquisition units 23, 24) based on the location information acquired by the location information acquisition unit 25, and the access permission information sent from the management device 100 to the mobile device 200, and allows the function units to operate only for a predetermined duration.

Now, the location information of this embodiment is sent from the mobile device 200 to the management device 100. In this case, access permission of the information acquisition units 23, 24 are determined in the management device 100, based on the location information. The access permission information is information which indicates the result of determination, and more specifically, information used for unlocking the prohibition of operations of the information acquisition units 23, 24.

Note however that, alternatively to this embodiment, the location information may be preliminarily recorded in the storage unit 26 of the mobile device 200. In this case, the access permission information is sent from the management device 100 to the mobile device 200, in response to a request from the mobile device 200. The access permission information is list information (list-of-permitted-location information) of the location information where the information acquisition units 23, 24 are permitted to operate. The control unit 20 of the mobile device 200 collates the list-of-permitted-location information contained in the access permission information, with the location information acquired by the location information acquisition unit 25. If it is determined that the location information of the mobile device 200 is contained in the list-of-permitted-location information, the control unit 20 unlocks the prohibition of operation of the information acquisition units 23, 24.

The management device 100 of this embodiment has a second reception unit 10, a propriety determination unit 111, and the second transmission unit 15. The second reception unit 10 receives the access request information from the mobile device 200. The propriety determination unit 111 determines whether the information acquisition units 23, 24 are permitted to operate or not, based on the location information attached to the access request information received by the second reception unit 10. The second transmission unit 15 sends, to the mobile device 200 via the network 300, the access permission information, if determined by the propriety determination unit 111 that the information acquisition units 23, 24 are permitted to operate.

The management device 100 has a storage unit 13 which stores permission/prohibition zone information 131.

The permission/prohibition zone information 131 is at least either permission zone information used for permitting access to the information acquisition units 23, 24, or prohibition zone information used for prohibiting access to the information acquisition units 23, 24.

The propriety determination unit 111 determines whether the information acquisition units 23, 24 are permitted to operate or not, based on the location information attached to the access request information, referring to the permission/prohibition zone information 131 stored in the storage unit 13.

The mobile device 200 may further have a transfer control unit 201. The transfer control unit 201 adds, when information was acquired by the information acquisition units 23, 24 operated only for a predetermined duration, the location information acquired by the location information acquisition unit 25 to the information, and transfers them via the network 300 to the management device 100. The management device 100 may further have an accessibility setting unit 112 which sets access permission/prohibition of the information, based on the location information attached to the information acquired by the information acquisition units 23, 24, and sent from the mobile device 200, referring to permission/prohibition zone information 131 stored in the storage unit 13.

The mobile device 200 may further have an encryption unit 202 which encrypts the information acquired when the information acquisition units 23, 24 are operated only for a predetermined duration. With this unit, when transfer by the transfer control unit 201 via the network 300 to the management device 100 is kept disabled, the information acquired by the information acquisition units 23, 24 operated only for a predetermined duration may be encrypted according to a predetermined procedure of encryption.

Next, an information management system of this embodiment will be detailed.

FIG. 1 is a block diagram illustrating a configuration of the information management system according to one embodiment of this invention.

The information management system 1000 has at least one information management device (server) 100, and a plurality of mobile devices 200-1, 200-2, . . . , 200-n (may collectively be referred to as "mobile device 200", hereinafter). The management device (server) 100 and each of the plurality of mobile devices 200-1, 200-2, . . . , 200-n take part in transmission/reception of various commands and information, via the network 300 such as the Internet or a leased communication line network.

The management device (server) 100 remotely manages the plurality of mobile devices 200-1, 200-2, . . . , 200-n, so as to remotely lock them when they are accidentally lost, to remotely wipe them (data erasure) to prevent information leakage, or to force them have a complexity in password lock through distribution of a security policy. The management device (server) 100 collects information acquired by the plurality of mobile devices 200-1, 200-2, . . . , 200-n (including confidential information, and other information), and collectively manage them (access permission, accumulation).

On the other hand, each of the plurality of mobile devices 200-1, 200-2, . . . , 200-n is configured by a general mobile phone or smartphone (multi-functional mobile phone), and has a communication function, photographing function, sound recording function, contents reproducing function and so forth. The mobile device 200 of this embodiment has a startup application restriction function which permits only a single application to be activated. For example, an application using a camera function, or an application using a sound recording function are normally disabled (non-startable), and by using the startup application restriction function, only the application using a camera function may be activated and enabled depending on needs.

Next, the management device (server) 100 of this embodiment will be outlined.

The management device (server) 100 of this embodiment is connected, via the network 300, to the mobile devices having the function units. The function units in this embodiment are exemplified by the information acquisition units 23, 24 which acquire information. The management device (server) 100 of this embodiment has the reception unit (second reception unit) 10, the storage unit 13, the propriety determination unit 111, and the transmission unit (second transmission unit) 15. The second reception unit 10 receives, from the mobile device 200, the access request information attached with the location information for pointing a current location. The storage unit 13 stores the permission/prohibition zone information 131 used for permitting access to the function units (information acquisition units 23, 24).

The propriety determination unit 111 refers to the permission/prohibition zone information 131, based on the location information attached to the access request information. The permission/prohibition zone information 131 is stored in the storage unit 13. By using it, the propriety determination unit 111 determines whether the function units (information acquisition units 23, 24) possessed by the mobile device 200 is permitted to operate or not. The second transmission unit 15 sends access permission information via the network 300 to the mobile device 200, when the propriety determination unit 111 determined to permit the function units (information acquisition units 23, 24) to operate.

Next, the management device (server) 100 of this embodiment will be detailed.

Figures 2A, 2B:
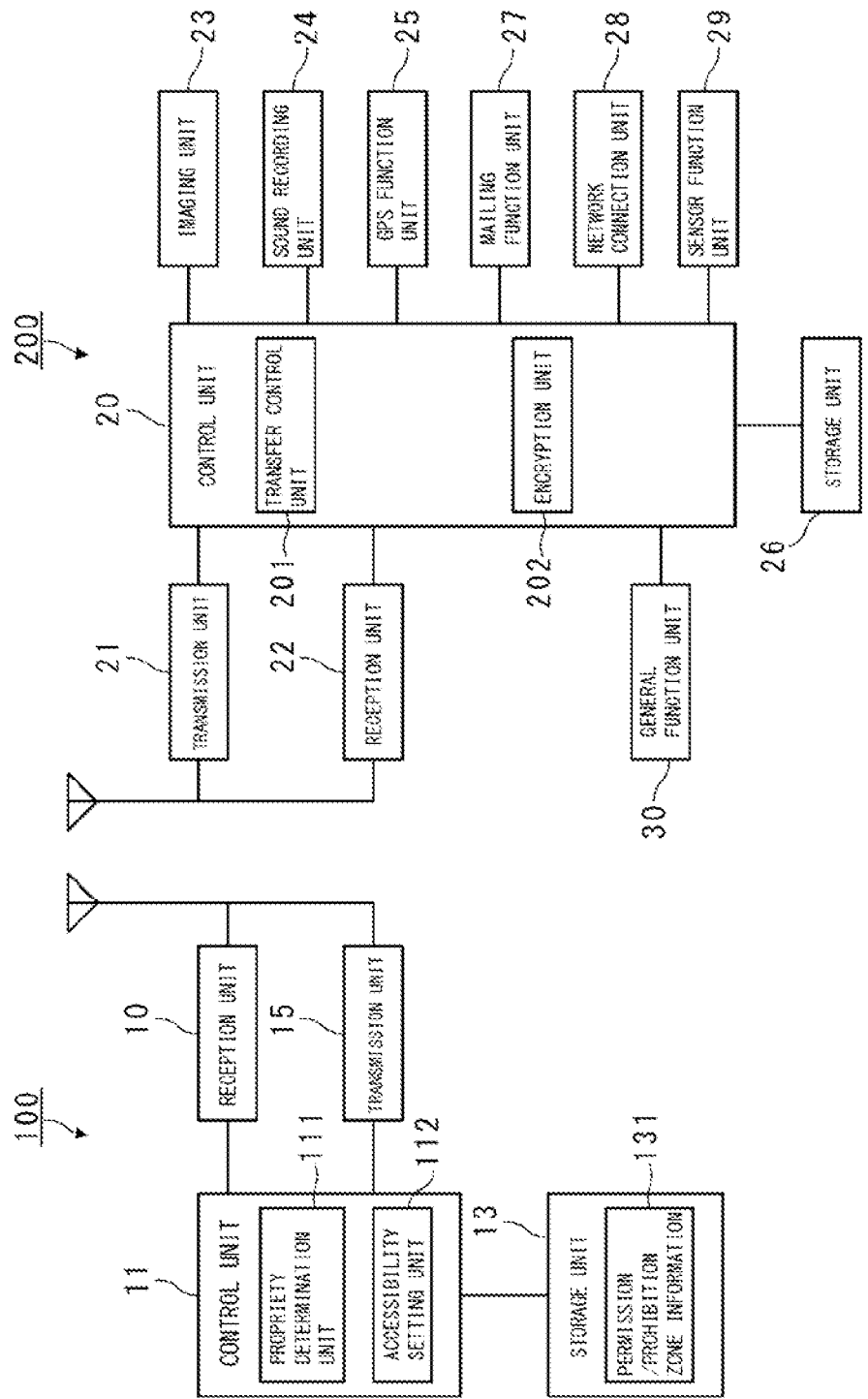
FIG. 2A is a block diagram illustrating a configuration of a management device of the embodiment.
FIG. 2B is a block diagram illustrating a configuration of a mobile device of the embodiment.

FIG. 2A is a block diagram illustrating a configuration of the management device (server) 100 of the embodiment. As seen in FIG. 2A, the management device (server) 100 has the second reception unit 10, the control unit 11, the storage unit 13 and the second transmission unit 15. The second reception unit 10 receives various information from the mobile device 200. The control unit 11 controls operations of the individual parts of the device, by executing a predetermined program product. The storage unit 13 is composed of a non-volatile memory or a hard disc drive, and stores such predetermined program product, various data and so forth.

In particular in this embodiment, the control unit 11 has the propriety determination unit 111 and the accessibility setting unit 112. The propriety determination unit 111 determines, based on the location information for pointing a current location of the mobile device 200, and referring to the permission/prohibition zone information 131 described later, whether the location is in a permission zone or in a prohibition zone, for every application. The accessibility setting unit 112 sets whether the information, acquired by the mobile device 200 and sent to the device, is accessible or not.

The storage unit 13 keeps the permission/prohibition zone information 131. The permission/prohibition zone information 131 keeps, for every application, the location information of permission zone where the application is accessible, and the location information of prohibition zone where the application is not accessible. More specifically, as described above, the propriety determination unit 111 determines whether the location is in the permission zone or in the prohibition zone, for every application, based on the location information for pointing a current location of the mobile device 200, referring to the permission/prohibition zone information 131. The second transmission unit 15 sends various information to the mobile device 200.

Next, the mobile device 200 of this embodiment will be outlined.

The mobile device 200 of this embodiment is connected via the network 300 to the management device 100. The mobile device 200 of this embodiment has the information acquisition units 23, 24 as the function units, the location information acquisition unit 25, the transmission unit (first transmission unit) 21, the reception unit (first reception unit) 22, and the control unit 20. The information acquisition units 23, 24, are the function units which acquire information. The location information acquisition unit 25 acquires the location information for pointing a current location.

The reception unit (first reception unit 22) receives the access permission information used for unlocking the prohibition of operation of the function units by the control unit 20, from the management device 100 via the network 300. The control unit 20 controls the function units so as to permit them to operate only for a predetermined duration, based on the location information and the access permission information.

The first transmission unit 21 sends, via the network 300 to the management device 100, the access request information, which is attached with the location information acquired by the location information acquisition unit 25, and is used for requesting access to the information acquisition units 23, 24. The first reception unit 22 receives, from the management device 100 via the network 300, the access permission information, or the access prohibition information in response to the access request information. The control unit 20 leaves the information acquisition units 23, 24 prohibited to operate, if the access permission information has not been received yet by the first reception unit 22. The control unit 20 then controls the information acquisition units 23, 24 so as to operate only for a predetermined duration to acquire information, upon reception of the access permission information by the first reception unit 22.

The location information acquisition unit 25 may acquire the location information which is calculated based on signals received from artificial satellites, as the location information for pointing a current location. In other words, the location information acquisition unit 25 of this embodiment may be a GPS (Global Positioning System) function unit.

The location information acquisition unit 25 may acquire identification information of a communicable wireless access point, which is installed in a permission zone where access to the information acquisition units 23, 24 are permitted, or in a prohibition zone where access to the information acquisition units 23, 24 are prohibited, as the location information for pointing a current location.

The control unit 20 may further have a transfer control unit 201 which controls the first transmission unit 21 to transfer information, acquired by the information acquisition units 23, 24 operated only for a predetermined duration, via the network 300 to the management device 100.

The mobile device 200 may have an encryption unit 202 which encrypts information, acquired by allowing the information acquisition units 23, 24 to operate only for a predetermined duration, according to a predetermined procedure of encryption.

Next, the mobile device 200 of this embodiment will be detailed below.

FIG. 2B is a block diagram illustrating a configuration of the mobile device 200 of the embodiment. As seen in FIG. 2B, the mobile device 200 has the control unit 20, the first transmission unit 21, the first reception unit 22, the imaging unit 23, the sound recording unit 24, the location information acquisition unit 25 and the storage unit 26. The control unit 20 executes a predetermined program product to control operations of the individual parts of the device. In particular in this embodiment, the control unit 20 has the transfer control unit 201 and the encryption unit 202. The transfer control unit 201 transfers information acquired by the imaging unit 23, the sound recording unit 24 and so forth to the management device (server) 100. The encryption unit 202 encrypts the thus-acquired information, when the acquired information cannot be transferred to the management device (server) 100, for reasons of nonconformity in the communication line or the like.

The first transmission unit 21 sends various information to the management device (server) 100. The first reception unit 22 receives various information from the management device (server) 100. The imaging unit 23 is configured by optical parts such as lens, an image sensor and a control mechanism therefor, and takes still image or movie under control by the control unit 20. The sound recording unit 24 is configured by a microphone and a sound control function, and records sound under the control by the control unit 20. The location information acquisition unit 25 acquires the location information for pointing a current location, by receiving signals from several satellites above in the sky. The storage unit 26 is configured by a non-volatile memory, a hard disk drive and so forth, and stores the predetermined program product, various data and so forth.

An information management method, which manages information using the information management system 1000 of this embodiment (may occasionally be referred to as "this method", hereinafter) will now be explained. This method includes a location information acquisition step, an access request information sending step, an access request information reception step, a propriety determination step, an access permission information sending step, an access permission information reception step, and a control step.

In the location information acquisition step, the location information for pointing a current location of the mobile device 200 is acquired. In the access request information sending step, the location information is attached to the access request information which is used for requesting access to the function units (information acquisition units 23, 24) possessed by the mobile device 200, and then sent via the network 300 to the management device 100. In the access request information reception step, the access request information from the mobile device 200 is received by the management device 100. In the propriety determination step, whether the function units (information acquisition units 23, 24) possessed by the mobile device 200 are permitted to operate or not, is determined by the management device 100, based on the location information attached to the access request information received in the access request information reception step.

In the access permission information sending step, the access permission information is sent from the management device 100 to the mobile device 200 via the network 300, if a determination was made in the propriety determination step so as to permit the function units (information acquisition units 23, 24) to operate. In the access permission information reception step, the access permission information in response to the access request information is received by the mobile device 200, from the management device 100 via the network 300. In the control step, leaving the function units (information acquisition units 23, 24) possessed by the mobile device 200 prohibited to operate, if the access permission information has not been received yet, and the function units (information acquisition units 23, 24) are controlled so as to operate only for a predetermined duration to acquire information, upon reception of the access permission information.

The program product of this embodiment is an application program product run on a computer (processor of the mobile device) to manage and process information. The program product of this embodiment characteristically makes the computer execute: a location information acquisition process, acquiring location information for pointing a current location; a sending process, sending the access request information attached with the location information, used for requesting access to the function units (information acquisition units 23, 24), via the network 300 to the management device 100; a reception process, receiving the access permission information or access prohibition information in response to the access request information, from the management device via the network; and a control process, leaving the function units (information acquisition units 23, 24) prohibited to operate if the access permission information has not been received yet, and controlling the function unit (information acquisition units 23, 24) so as to operate only for a predetermined duration to acquire information, upon reception of the access permission information.

The program product of this embodiment may be provided via the network 300, or in the form of a computer-readable storage medium which stores it. In other words, the storage medium of this embodiment is a storage medium which stores the above-described program product recorded in a computer-readable manner to be executed by the computer.

This method will further be detailed.

Figure 3:
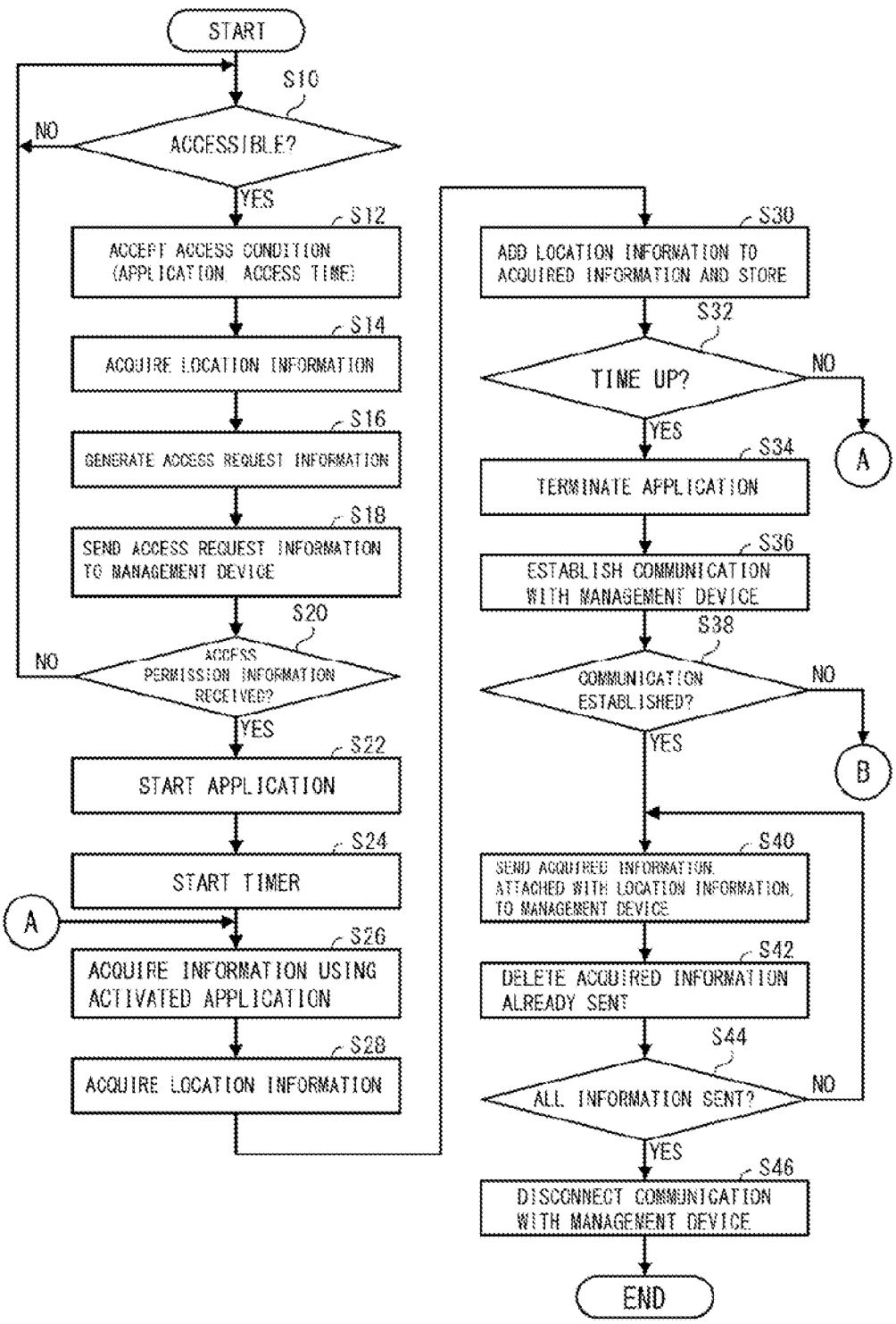
FIG. 3 A flow chart for explaining operations of the mobile device of this embodiment.
Figure 4:
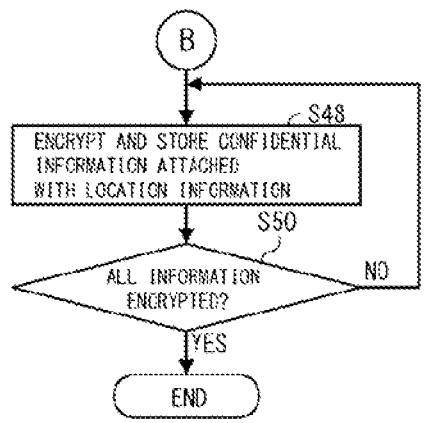
FIG. 4 A flow chart for explaining operations of the mobile device of this embodiment.

First, operations of the mobile device 200 of this embodiment will be explained. FIG. 3 and FIG. 4 are flow charts for explaining the operations of the mobile device 200 of this embodiment.

In step S10, the control unit 20 determines whether any operation for requesting access permission of application was issued by the user or not. The user operates to acquire the access permission of a desired application, typically by selecting the desired application from a predetermined function list, or by touching an icon of the desired application on a predetermined menu screen. If there was no operation by the user for acquiring the access permission of application (NO in step S10), the process returns back to step S10 to stay in the idle state. In contrast, if there was operation by the user for acquiring the access permission of application (YES in step S10), the process advances to step S12. The paragraphs below will explain an exemplary case where an imaging application using the imaging unit (photographing function) 23 is activated as the application.

In step S12, the control unit 20 accepts from the user, for example, the access time during which the application is accessible. The access time may have a fixed value (15 minutes, for example), or may be selectable by the user from a preliminarily prepared list containing 5 minutes, 10 minutes, 15 minutes, 30 minutes and so on.

In step S14, the control unit 20 acquires, using the location information acquisition unit 25, the location information for pointing a current location.

In step S16, the control unit 20 attaches a unique identification information assigned to the mobile device 200, the name of application, the access time and the location information according to a predetermined format, to create the access request information.

In step S18, the control unit 20 sends the access request information, through the first transmission unit 21 to the management device (server) 100. Upon reception of the access request information from the mobile device 200, the management device (server) 100 determines whether the requested application is accessible or not, based on the location information. If the requested application is accessible, the management device (server) 100 returns the access permission information. Operations of the management device (server) 100 will be detailed later.

In step S20, the control unit 20 determines whether the first reception unit 22 received the access permission information from the management device (server) 100 or not. If the access permission information has not been received yet (NO in step S20), the process goes back to step S10. In this case, the requested application, or the imaging application, is not permitted to be accessed. This is because the current location of the mobile device 200, obtained from the location information, is in the prohibition zone for the imaging application. In this case, a message stating that the imaging application is not accessible may be notified (displayed). Meanwhile, when the access permission information has been received (YES in step S20), the process advances to step S22.

In step S22, the control unit 20 starts up the requested application, for example, the imaging application which uses the imaging unit 23.

In step S24, the control unit 20 starts a timer which measures the access time of the imaging application.

In step S26, the control unit 20 acquires information using the thus activated application. More specifically, if the activated application is an imaging application, the user takes an image of its desired object using the imaging application. The management device (server) 100 determines accessibility, based on the location information acquired when the user sent the access request for the application. The mobile device 200 may, however, move into the prohibition zone within the access time after the access permission was received. In this case, the acquired information may contain confidential information. For example, when the imaging application is used, an image of an object in the prohibition zone may be taken. In this embodiment, the location information for pointing a location where the information was acquired is attached as a metadata to the acquired information, so that the information acquired in the prohibition zone is discriminable.

In step S28, the control unit 20 acquires the location information for pointing a current location, using the location information acquisition unit 25 which is a GPS function unit. The location information may be acquired by a function of the activated imaging application. The location information points a location where the information was acquired. For the case of imaging application, this points a location of imaging.

In step S30, the control unit 20 adds the acquired location information as the metadata to the acquired information, and stores them in the storage unit 26. More specifically, the imaging application adds the location data for pointing the location of imaging, to the imaging data taken by the imaging unit 23, and then stores them.

In step S32, the control unit 20 determines whether the time was up or not. In other words, the requested access time was up or not. If the time has not been reached (NO in step S32), the process returns back to step S26, to loop through steps S26 to S32 until the time is up. The user can continue imaging using the imaging application until the time is up. Every time the user takes an image, the acquired imaging data is attached with the location information for pointing the location of imaging, and stored in the storage unit 26. When the application is in use, elapsed time or remaining time, or both of them may be notified (displayed). When the time was up (YES in step S32), the process advances to step S34.

In step S34, the control unit 20 closes (terminates) the (imaging) application having been activated. The imaging application is thus made inaccessible.

In step S36, the control unit 20 carries out procedures for establishing communication with the management device (server) 100, through the first reception unit 22 and the first transmission unit 21.

In step S38, the control unit 20 determines whether the communication with the management device (server) 100 has been established or not. If the communication with the management device (server) 100 has been established (YES in step S38), the process advances to step S40. On the other hand, if the communication has not been established (NO in step S38), the process advances to step S48 in FIG. 4.

In step S40, the control unit 20 sends the acquired information (imaging data), which is stored in the storage unit 26 and is attached with the location information, through the first transmission unit 21 to the management device (server) 100.

In step S42, the control unit 20 deletes the acquired information (imaging data) having been already sent to the management device (server) 100.

In step S44, the control unit 20 determines whether all acquired information (imaging data) stored in the storage unit 26 were sent to the management device (server) 100. If there are the acquired information (imaging data) remained unsent (NO in step S44), the process returns back to step S40, and loops through steps S40 to S44, thereby the first transmission unit 21 sends all acquired information (imaging data) stored in the storage unit 26 to the management device (server) 100. All acquired information (imaging data) having been sent are deleted.

In step S46, the control unit 20 disconnects the communication with the management device (server) 100. In this way, a series of procedures comes to the end.

As a consequence, the mobile device 200 will have no acquired information (imaging data) remained therein. Although the acquired information may occasionally contain the confidential information which should not be leaked out as described above, the acquired information has already been sent to the management device (server) 100, so that the acquired information (imaging data) will not be leaked from the mobile device 200.

If the communication with the management device (server) 100 is unable to be established for some reason, and the first transmission unit 21 cannot send the acquired information (imaging data) which possibly contains the confidential information to the management device (server) 100 (NO in step S38), the process takes place as follows. The control unit 20 encrypts the acquired information (imaging data) attached with the location information, using an encryption key which has been received from the management device (server) 100 typically when the request was sent, according to a predetermined method of encryption, and stores the result in the storage unit 26 (step S48). Any of known methods of encryption may arbitrarily be used in this embodiment, without limitation.

In step S50, the control unit 20 determines whether all acquired information (imaging data) have been encrypted. If there are some acquired information (imaging data) remained unencrypted (NO in step S50), the process returns back to step S48, to continue encryption of the acquired information (imaging data). Meanwhile, if all acquired information (imaging data) have been encrypted (YES in step S50), the process comes to the end. Accordingly, the user cannot view the image stored in the storage unit 26, even if the mobile device 200 were brought back to home.

The control unit 20 then tries to establish communication with the management device (server) 100 repetitively at predetermined time intervals (goes to step S36), and when the communication is established, sends the encrypted acquired information (imaging data) to the management device (server) 100 (step S40). Next, the control unit 20 deletes the acquired information (imaging data) having already been sent (step S42). The encrypted acquired information (imaging data) sent to the management device (server) 100 is decrypted by the management device (server) 100.

Accordingly, even if the acquired information (imaging data) could not be sent to the management device (server) 100 immediately after the application was closed, the control unit 20 will send the acquired information (imaging data) upon establishment of communication. In this way, the acquired information (imaging data) may be prevented from leaking from the mobile device 200.

Next, operations of the management device (server) 100 of this embodiment will be explained.

Figure 5:
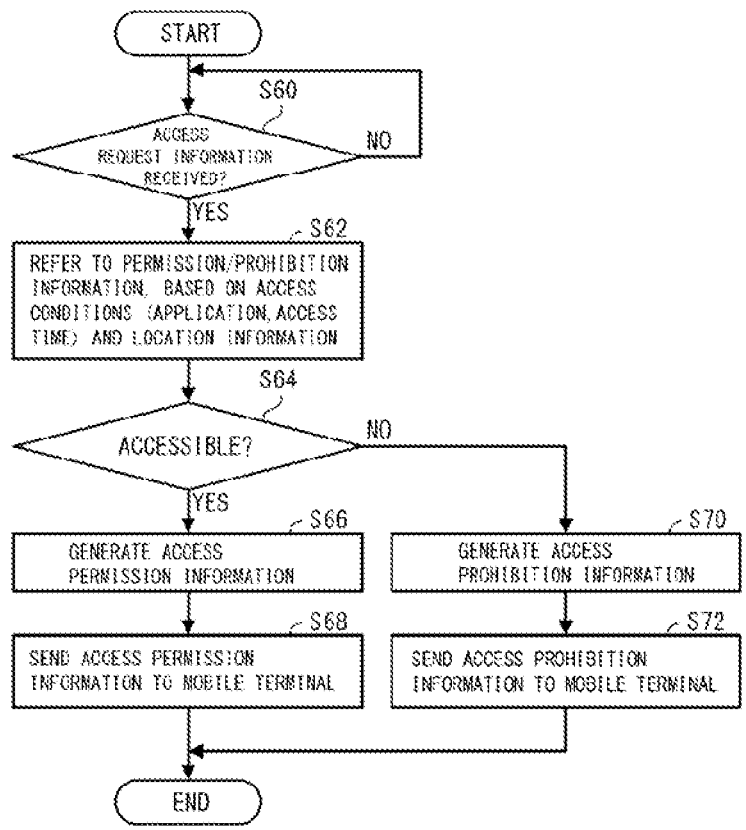
FIG. 5 A flow chart for explaining operations of the management device of this embodiment.

FIG. 5 is a flow chart for explaining an operation (accessibility determination) of the management device (server) 100 of this embodiment. The flow chart in FIG. 5 illustrates a process for determining whichever to be issued between access permission and access prohibition, based on the access request information from the mobile device 200.

In step S60, the control unit 11 determines whether the access request information from the mobile device 200 is received through the second reception unit 10 or not. If the access request information has not been received yet (NO in step S60), the process returns back to step S60, and the control unit 11 is brought into the idle state. Meanwhile, if the access request information from the mobile device 200 has been received (YES in step S60), the process advances to step S62.

In step S62, the propriety determination unit 111 refers to the permission/prohibition zone information 131 in the storage unit 13, based on access conditions (application, access time) and the location information.

In step S64, the propriety determination unit 111 determines whether the requested application is accessible or not, based on whether the mobile device 200 is in the permission zone or not. If the access permission is determined, or if the user is in the permission zone (YES in step S64), the process advances to step S66. Meanwhile, if the access prohibition is determined, or if the user is in the prohibition zone (NO in step S64), the process advances to step S70.

In step S66, the propriety determination unit 111 generates the access permission information which indicates permission of access to the requested application.

In step S68, the propriety determination unit 111 sends the access permission information to the mobile device 200, through the second transmission unit 15. The process then comes to the end.

In step S70, the propriety determination unit 111 generates the access prohibition information which prohibits access to the requested application.

In step S72, the propriety determination unit 111 sends the access prohibition information, through the second transmission unit 15, to the mobile device 200. The process then comes to the end.

As described above, upon reception of the access request information, the management device (server) 100 determines whether the mobile device 200 which sent the access request is in the permission zone where the requested application is accessible, or in the prohibition zone, based on the location information attached to the access request information. If the mobile device 200 which sent the access request is in the permission zone, the access permission information is sent to the mobile device 200. Since access to the application is prohibited in the prohibition zone, it now becomes possible to prevent leakage of confidential information in the prohibition zone, while improving the convenience since the application remains accessible in the permission zone.

Figure 6:
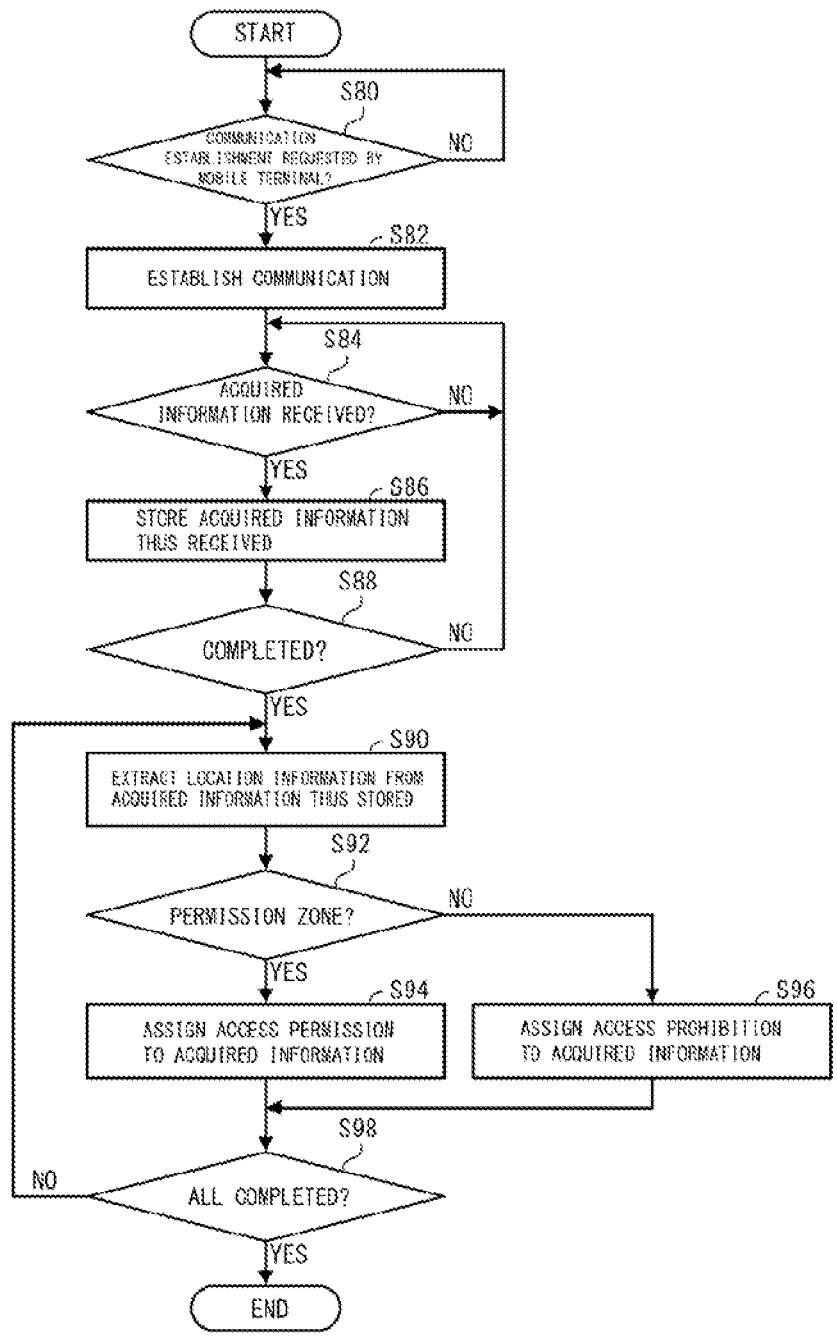
FIG. 6 A flow chart for explaining operations of the management device of this embodiment this embodiment.

FIG. 6 is a flow chart for explaining an operation (information management) of the management device (server) 100 of this embodiment. The flow chart of FIG. 6 illustrates information management by which the information acquired by the mobile device 200 is collected and managed.

In step S80, the control unit 11 determines whether a communication establishment request was received from the mobile device 200 or not. If the communication establishment request has not been received yet (NO in step S80), the process returns back to step S80 to stay in the idle state. Meanwhile, if the communication establishment request has been received from the mobile device 200 (YES in step S80), the process advances to step S82.

In step S82, the control unit 11 establishes communication with the mobile device 200 which sent the communication establishment request. Note, however, that the control unit 11 may sometimes fail to establish a communication line to the mobile device, due to some failure on the communication line, as described above. In this case, the mobile device 200 sends the communication establishment request again, after the elapse of a predetermined length of time.

In step S84, the control unit 11 determines whether the acquired information (imaging data) was received from the mobile device 200 or not. If the acquired information (imaging data) has not been received yet from the mobile device 200 (NO in step S84), the process waits in step S84. Meanwhile, if the acquired information (imaging data) has been received from the mobile device 200 (YES in step S84), the process advances to step S86.

In step S86, the control unit 11 stores the acquired information (imaging data), received by the second reception unit from the mobile device 200, into the storage unit 13.

In step S88, whether all acquired information (imaging data) were received by the second reception unit 10 or not is determined.

If there is acquired information (imaging data) which remains unreceived yet by the second reception unit 10 (NO in step S88), the process returns back to step S84, and the control unit 11 loops through steps S84 to S88. In this way, the second reception unit receives all acquired information (imaging data) from the mobile device 200. Meanwhile, if all acquired information (imaging data) have been received by the second reception unit 10 (YES in step S88), the process advances to step S90.

In step S90, the control unit 11 extracts the location information from the acquired information (imaging data) stored in the storage unit 13.

In step S92, the control unit 11 refers to the permission/prohibition zone information 131 in the storage unit 13, based on the thus extracted location information, to determine whether the location is in the permission zone or not. If the acquired information (imaging data) relevant to the location information is determined to have been obtained in the permission zone (YES in step S92), the process advances to step S94. Meanwhile, if the information (imaging data) was determined to have been acquired in the prohibition zone (NO in step S92), the process advances to step S96.

In step S94, the control unit 11 assigns access permission to the information (imaging data) acquired in the permission zone.

In step S96, the control unit 11 assigns access prohibition to the information (imaging data) acquired in the prohibition zone.

In step S98, the control unit 11 determines whether accessibility was assigned to all acquired information or not. If there is some acquired information (imaging data) which remains unassigned with accessibility (NO in step S98), the process returns back to step S90, and repeats the above-described processes for the next acquired information (imaging data). Meanwhile, if all acquired information (imaging data) were assigned with accessibility (YES in step S98), the control unit 11 closes the process.

As descried above, since the management device (server) 100 fetches all information acquired by the mobile device 200, the information will not leak from the mobile device 200.

The management device (server) 100 determines whether the information was acquired in the permission zone or not, based on the location information attached to the acquired information, and assigns access permission to the information acquired in the permission zone, so as to make the information accessible. Accordingly, the information acquired by the mobile device 200, even if possibly contains confidential information acquired in the prohibition zone for the reason described above, may be prevented from being leaked.

The acquired information assigned with access permission (information acquired in the permission zone) may be limited in the purpose of use, such as view-only, or copy-approved, depending on the type of information, location of acquisition (location information) and so forth.

This invention is not limited to the embodiments described above, and encompasses various modifications and improvements so long as the effect of this invention may be achieved.

The mobile device 200 and the information management system 1000 described above exemplified the case where the location information acquired by the mobile device 200 is sent to the management device 100, and permission/prohibition of operation of the function unit is determined by the management device 100. Alternatively, the control unit 20 of the mobile device 200 may refer to access permission information (the list-of-permitted-location information described above) received from the management device 100 via the network 300, and may determine whether prohibition of operation of the function unit may be unlocked or not, based on the location information acquired by the location information acquisition unit 25. The function unit may be controlled to operate based on the result of determination.

According to such modified example, by virtue of the list-of-permitted-location information preliminarily received by the mobile device 200 from the management device 100, access permission of the mobile device 200 may be determined to unlock the prohibition of operation of a predetermined function unit, even at a location where the communication environment is poor. While the mobile device 200 in the embodiment described previously may move into the prohibition zone after the access request information was received, the mobile device 200 in this modified example takes part in the propriety determination, so that operation of the function unit may be prohibited again in a real-time manner as the mobile device 200 moves.

The transmission unit (first transmission unit 21) of the mobile device 200 may send the identification information which identifies the mobile device 200 or the user of the mobile device 200, via the network 300 to the management device 100. The reception unit (first reception unit 22) of the mobile device 200 receives, from the management device 100 via the network 300, the access permission information or the access prohibition information in response to the identification information. Then the control unit 20 may control the function unit so as to operate only for a predetermined duration, upon reception of the access permission information by the reception unit (first reception unit 22).

According to such modified example, it now becomes possible to unlock prohibition of the function unit irrespective of the location of the mobile device 200, by specifying the user such as a system developer, a representative of a company and so forth, to whom operation of the function unit should exceptionally be permitted all the time.

While the mobile device 200 in the embodiment above was configured to acquire the location information for pointing a current location using the GPS function unit (location information acquisition unit 25), this invention is not limited thereto. It is alternatively possible to make access to a Wi-Fi access point (AP) in the prohibition zone (or permission zone), to send the SSID (Service Set Identifier) of the AP to the management device (server) 100, and to determine that the location is in the prohibition zone (or permission zone).

Still alternatively, the mobile device 200 may receive a signal which indicates that the location is in the prohibition zone (or permission zone) from a transmitter via Bluetooth (registered trademark), transfer the signal to the management device (server) 100, to determine that the location is in the prohibition zone (or permission zone). In this case, a positional accuracy of 10 m or around may be achieved. It may also be configured that transmission of the access request information is disabled when the Bluetooth (registered trademark) function is turned OFF.

If an IC card used as an employee ID card has a function of recording passage through an entry-exit gate of a facility, the mobile device 200 may communicate with the IC card to generate its location information.

It is recommended to turn OFF the control application when the network is disconnected. It is, herewith, not acceptable to use this to avoid determination of the prohibition zone.

While the management device (server) 100 in the embodiment above was configured to determine that the location of imaging is not in the prohibition zone, based on the location information (location of imaging) attached to the imaging data, this invention is not limited thereto. If an object which should not be imaged is preliminarily specified, a small pattern mark such as an AR (Augmented Reality) marker may be placed on the object or around. If the pattern mark is found in the imaging data, the management device (server) 100 may determine the imaging data to be "viewing/copying restricted".

While the scheduled access time of application in the embodiment above was given as a fixed value, or selectable by the user from a preliminarily prepared list of the plurality of access times, this invention is not limited thereto. It is possible to calculate the distance between a current location, based on the location information of the mobile device 200, and the nearest prohibition zone, and the maximum allowable scheduled access time may be set short if the distance is short, and may be set long if the distance is long. With this, it becomes now possible to prevent acquisition of the confidential information, by once receiving the access permission and then moving into the prohibition zone.

In the embodiment above, every application may independently be applied with an operational rule. For example, the prohibition zone for an application using the imaging unit 23 and the prohibition zone for an application using the sound recording unit 24 may be different. In other words, depending on the prohibition zones, imaging is restricted but sound recording is acceptable, and vice versa.

In the embodiment above, it is also possible to intermittently update the location information of the mobile device 200, after reception of the access permission up to the end of the scheduled access time, so as to determine that the mobile device 200 does not move into the prohibition zone. In this case, the application may forcedly be closed even before the end of the scheduled access time, if the mobile device 200 was found to move into the prohibition zone.

The management device (server) 100 and the mobile device 200 of this invention may be configured to read a computer program product and to execute corresponding process operations, embodied in the form of hardware configured by general devices such as CPU (Central Processing Unit), ROM (Read Only Memory), RAM (Random Access Memory) and I/F (Interface) unit; a dedicated logic circuit configured to execute a predetermined process operation; and combination of them. The various constituents of this invention will suffice if they are formed so as to demonstrate their functions, and may be embodied typically in the form of dedicated hardware which demonstrates a predetermined function, data processing device assigned with a predetermined function through a computer program product, a predetermined function embodied by a computer program product on the data processing device, and combination of them. Such various constituents of this invention are not necessarily independent from each other, but allows for example that one constituent forms a part of other constituent, and that a part of certain constituent overlaps with a part of other constituent.

The phrase stating that "the constituents (storage unit 13, storage unit 26) of this invention store data" means that the device of this invention has a function of storing data, without needing that the data is stored therein all the time.

Order of execution of the plurality of steps contained in the information management method of this invention may be modified without adversely affecting this invention, allowing that a part of, or all of the plurality of steps are executed in a temporally overlapped manner.

The embodiments having described above encompass the technical concepts below:

(1) A mobile device connected via a network to an information management device, the mobile device includes:

a reception means which receives information via the network from the information management device;

a control means which leaves a part of a plurality of function units possessed by the mobile device prohibited to operate; and a location information acquisition means which acquires location information for pointing a current location, the reception means receiving access permission information, used for unlocking operation of the function unit having been prohibited by the control means, from the information management device via the network, and the control means controlling the function unit so as to operate only for a predetermined duration, based on the location information and the access permission information.

(2) The mobile device according to (1), further including:

an information acquisition means as the function unit; and a transmission means which sends, via the network to the information management device, access request information, which is attached with location information acquired by the location information acquisition means, and is used for requesting access to the information acquisition means, the reception means receives, from the information management device via the network, access permission information or access prohibition information in response to the access request information, and the control means leaves the information acquisition means prohibited to operate, if the access permission information has not been received yet by the reception means, and controls the information acquisition means so as to operate only for a predetermined duration to acquire information, upon reception of the access permission information by the reception means.

(3) The mobile device according to (1) or (2), wherein the control means refers to the access permission information received from the information management device via the network, to determine whether prohibition of operation of the function unit is unlocked or not based on the location information acquired by the location information acquisition means, and controls the function unit to operate based on the result of determination.

(4) The mobile device according to any one of (1) to (3), further including a transmission means which sends, via the network to the information management device, identification information which indicates the mobile device or the user of the mobile device, the reception means receives, from the information management device via the network, access permission information or access prohibition information in response to the identification information, and the control means controls the function unit so as to operate only for a predetermined duration, upon reception of the access permission information by the reception means.

(5) The mobile device according to any one of (1) to (4), wherein the location information acquisition means acquires the location information which is calculated based on signals received from artificial satellites, as the location information for pointing a current location.

(6) The mobile device according to any one of (1) to (4), wherein the location information acquisition means acquires identification information of a communicable wireless access point, which is installed in a permission zone where access to the information acquisition means is permitted, or in a prohibition zone where access to the information acquisition means is prohibited, as the location information for pointing a current location.

(7) The mobile device according to any one of (1) to (6), wherein the control means further includes a transfer control means which transfers information, acquired by the information acquisition means operated only for a predetermined duration, via the network to the information management device.

(8) The mobile device according to any one of (1) to (6), further including an encryption means which encrypts information, acquired by allowing the information acquisition means to operate only for a predetermined duration, according to a predetermined procedure of encryption.

(9) An information management system including a mobile device and an information management device connected to each other via a network, the mobile device including:

a reception means which receives information via the network from the information management device;

a plurality of function units;

a control means which leaves a part of the plurality of function units prohibited to operate; and a location information acquisition means which acquires location information for pointing a current location, the information management device including:

a transmission means which sends, to the mobile device via the network, access permission information used for unlocking operation of the function unit having been prohibited by the control means; and the control means unlocks the prohibition of operation of the function unit, and allows the function unit to operate only for a predetermined duration, based on the location information acquired by the location information acquisition means, and the access permission information sent from the information management device to the mobile device.

(10) The information management system according to (9), wherein the control means refers to the access permission information received from the information management device via the network, to determine whether prohibition of operation of the function unit is unlocked or not, based on the location information acquired by the location information acquisition means, and controls the function unit to operate based on the result of determination.

(11) The information management system according to (9) or (10), further including:

a transmission means which sends, via the network to the information management device, identification information which indicates the mobile device or the user of the mobile device, the reception means receives, from the information management device via the network, access permission information or access prohibition information in response to the identification information, and the control means controls the function unit to operate only for a predetermined duration, upon reception of the access permission information by the reception means.

(12) The information management system according to any one of (9) to (11), wherein the mobile device further includes:
an information acquisition means as the function unit; and
a first transmission means which sends, via the network to the information management device, access request information, which is attached with location information acquired by the location information acquisition means, and is used for requesting access to the information acquisition means,
the reception means is a first transmission means which receives, from the information management device via the network, access permission information or access prohibition information in response to the access request information,
the control means leaves the information acquisition means prohibited to operate, if the access permission information has not been received yet, and controls the information acquisition means so as to operate only for a predetermined duration to acquire information, upon reception of the access permission information by the reception means,
the information management device further includes:
a second reception means which receives access request information from the mobile device; and
a propriety determination means which determines whether the information acquisition means is permitted to operate or not, based on the location information attached to the access request information received by the second reception means,
and,
the transmission means is a second transmission means which sends, to the mobile device via the network, the access permission information, if determined by the propriety determination means that the information acquisition means is permitted to operate.

(13) The information management system according to (12),
wherein the information management device further includes:
a storage means which stores at least either permission zone information used for permitting access to the information acquisition means, or prohibition zone information used for prohibiting access to the information acquisition means,
and,
the propriety determination means determines whether the information acquisition means is permitted to operate or not, based on the location information attached to the access request information, referring to at least either the permission zone information or the prohibition zone information stored in the storage means.

(14) The information management system according to (13),
wherein the mobile device further includes a transfer control means which adds, when the information was acquired by the information acquisition means operated only for a predetermined duration, the location information acquired by the location information acquisition means to the information, and transfers them via the network to the information management device,
and,
the information management device further includes an accessibility setting means which sets access permission/prohibition of the information, based on the location information attached to the information acquired by the information acquisition means, and sent from the mobile device, referring to at least either the permission zone information or the prohibition zone information stored in the storage means.

(15) The information management system according to (14),
wherein the mobile device further includes an encryption means which encrypts the information acquired when the information acquisition means is operated only for a predetermined duration.

(16) An information management device connected via a network to a mobile device equipped with a function unit, the information management device including:
a reception means which receives, from the mobile device, access request information attached with location information for pointing a current location;
a storage means which stores at least either permission zone information used for permitting access to the function unit, or prohibition zone information used for prohibiting access to the function unit;
a propriety determination means which determines whether the function unit possessed by the mobile device is permitted to operate or not, based on the location information attached to the access request information, referring to at least either the permission zone information or the prohibition zone information stored in the storage means; and
a transmission means which sends access permission information to the mobile device via the network, when the propriety determination means determined to permit the function unit to operate.

(17) An information management method implemented by using a mobile device and an information management device which are connected to each other via a network, the method including:
a location information acquisition step, acquiring location information for pointing a current location of the mobile device;
an access request information sending step, attaching the location information to access request information used for requesting access to a function unit provided to the mobile device, and sending them via the network to the information management device;
an access request information reception step, receiving the access request information from the mobile device by the information management device;
a propriety determination step, determining by the information management device, whether the function unit provided to the mobile device is permitted to operate or not, based on the location information attached to the access request information received in the access request information reception step;
an access permission information sending step, sending access permission information if a determination was made in the propriety determination step so as to permit the function unit to operate, from the information management device to the mobile device via the network;
an access permission information reception step, receiving by mobile device from the information management device via the network, the access permission information in response to the access request information; and
a control step, leaving the function unit possessed by the mobile device prohibited to operate, if the access permission information has not been received yet, and controlling the function unit so as to operate only for a predetermined duration to acquire information, upon reception of the access permission information.

(18) A program product used for information management using a computer of a mobile device, the mobile device being connected via a network to an information management device, and being equipped with a function unit, the program product making the computer execute:

a location information acquisition process, acquiring location information for pointing a current location;

a sending process, sending access request information attached with the location information, used for requesting access to the function unit, via the network to the information management device;

a reception process, receiving access permission information or access prohibition information in response to the access request information, from the information management device via the network; and a control process, leaving the function unit prohibited to operate if the access permission information has not been received yet, and controlling the function unit so as to operate only for a predetermined duration upon reception of the access permission information.

(19) A storage medium storing a program product recorded so as to be readable by a computer of a mobile device, the mobile device being connected via a network to an information management device, and being equipped with a function unit, the program product making the computer execute:

a location information acquisition process, acquiring location information for pointing a current location;

a sending process, sending access request information attached with the location information, used for requesting access to the function unit, via the network to the information management device;

a reception process, receiving access permission information or access prohibition information in response to the access request information, from the information management device via the network; and a control process, leaving the function unit prohibited to operate if the access permission information has not been received yet, and controlling the function unit so as to operate only for a predetermined duration upon reception of the access permission information.

This application claims priority on Japanese Patent Application No. 2013-059370, filed Mar. 22, 2013, the entire disclosure of which is incorporated into this application.

The invention claimed is:

1. A mobile device connected via a network to an information management device, the mobile device comprising:

a reception means which receives information via the network from the information management device;

a location information acquisition means which acquires location information for pointing a current location of the mobile device, and a control means which leaves an information acquisition means possessed by the mobile device prohibited to operate or permitted to operate based on the location information;

the reception means receiving access permission information, used for unlocking operation of the information acquisition means having been prohibited by the control means, or access prohibition information used for locking operation of the information acquisition means, from the information management device via the network, the control means controlling the information acquisition means to operate or terminate the information acquisition means, based on the access permission information or the access prohibition information, the control means having a transfer control means which transfers the information acquired by allowing the information acquisition means to operate, via the network to the information management device, and the control means determining whether the acquired information was transferred by the transfer control means to the information management device or not, and deleting the information having already been transferred, wherein while the control means leaves the information acquisition means prohibited to operate, the reception means receives the access permission information from the information management device, the location information acquisition means intermittently acquires the location information, after the reception means received the access permission information, and the control means controls the information acquisition means, having been prohibited to operate, so as to operate based on the location information and the access permission information, and, determines whether or not the mobile device has moved into a prohibition zone where the information acquisition means is inaccessible, based on the intermittently acquired location information and the access permission information, and terminates operation of the information acquisition means being operated, if determined that the mobile device has moved into the prohibition zone.

2. The mobile device according to claim 1, wherein the reception means preliminarily receives an encryption key from the information management device via the network, the control means further comprises an encryption means which encrypts the information acquired by allowing the information acquisition means to operate, using the encryption key according to a predetermined procedure of encryption, and the control means determines whether the acquired information was encrypted by the encryption means or not, makes the transfer means transfer the encrypted information to the information management device, and deletes the information having already been transferred.

3. The mobile device according to claim 2, further comprising a storage means, the control means encrypts the information using the encryption means, when it is unable to establish communication with the information management device via the network, and stores the encrypted information in the storage means.

4. The mobile device according to claim 3, wherein, when communication with the information management device is established via the network, the control means makes the information management device transfer the encrypted information stored in the storage means to the information management device, and deletes the information having already been transferred.

5. The mobile device according to claim 1, further comprising:

a transmission means which sends, via the network to the information management device, access request information, which is attached with location information acquired by the location information acquisition means, and is used for requesting access to the information acquisition means, the reception means receives, from the information management device via the network, the access permission information or the access prohibition information in response to the access request information, and the control means leaves the information acquisition means prohibited to operate, if the access permission information has not been received yet by the reception means, and controls the information acquisition means so as to operate only for a predetermined duration to acquire information, upon reception of the access permission information by the reception means.

6. The mobile device according to claim 1, further comprising:
the control means refers to the access permission information received from the information management device via the network, to determine whether the prohibition of operation of the information acquisition means is unlocked or not, based on the location information acquired by the location information acquisition means, and controls the information acquisition means to operate based on the result of determination.

7. The mobile device according to claim 1, further comprising:
a transmission means which sends, via the network to the information management device, identification information which indicates the mobile device or the user of the mobile device,
the reception means receives, from the information management device via the network, the access permission information or the access prohibition information in response to the identification information, and
the control means controls the information acquisition means to operate, upon reception of the access permission information by the reception means.

8. The mobile device according to claim 1, further comprising:
the location information acquisition means acquires identification information of a communicable wireless access point, which is installed in a permission zone where the information acquisition means is accessible, or in a prohibition zone where the information acquisition means is inaccessible, as the location information for pointing a current location.

9. An information management system comprising a mobile device and an information management device connected to each other via a network,
the mobile device comprising:
a reception means which receives information via the network from the information management device;
a location information acquisition means which acquires location information for pointing a current location of the mobile device;
an information acquisition means; and
a control means which leaves the information acquisition means prohibited to operate based on the location information;
the information management device comprising:
a transmission means which sends access permission information, used for unlocking operation of the information acquisition means having been prohibited by the control means, or access prohibition information used for locking operation of the information acquisition means, to the mobile device via the network,
the control means unlocks the prohibition or permission of operations of the information acquisition means to thereby allow the information acquisition means to operate or terminate, based on the access permission information or the access prohibition information sent from the information management device to the mobile device,
the control means has a transfer control means which transfers the information acquired by allowing the information acquisition means to operate, via the network to the information management device, and
the control means determines whether the acquired information was transferred by the transfer control means to the information management device, and deletes the information having already been transferred,
wherein
while the control means leaves the information acquisition means prohibited to operate,
the reception means receives the access permission information from the information management device,
the location information acquisition means intermittently acquires the location information, after the reception means received the access permission information, and
the control means controls the information acquisition means, having been prohibited to operate, so as to operate based on the location information and the access permission information, and, determines whether or not the mobile device has moved into a prohibition zone where the information acquisition means is inaccessible, based on the intermittently acquired location information and the access permission information, and terminates operation of the information acquisition means being operated, if determined that the mobile device has moved into the prohibition zone.

10. The information management system according to claim 9,
wherein the transmission means of the information management device sends an encryption key, via the network to the mobile device,
the reception means of the mobile device receives the encryption key,
the control means of the mobile device further comprises an encryption means which encrypts the information acquired by allowing the information acquisition means to operate, using the encryption key according to a predetermined procedure of encryption,
the control means determines whether the acquired information was encrypted by the encryption means, makes the transfer control means transfer the encrypted information to the information management device, and deletes the information having already been transferred, and
the information management device receives and decrypts the transferred information.

11. The information management system according to claim 9,
wherein the mobile device further comprises:
a first transmission means which sends, via the network to the information management device, access request information, which is attached with the location information acquired by the location information acquisition means, and is used for requesting access to the information acquisition means,
the reception means is a first reception means which receives, from the information management device via the network, the access permission information or the access prohibition information in response to the access request information,
the control means leaves the information acquisition means prohibited to operate, if the access permission information has not been received yet, and controls the information acquisition means so as to operate only for a predetermined duration to acquire information, upon reception of the access permission information by the reception means, the information management device further comprises:
a second reception means which receives access request information from the mobile device; and
a propriety determination means which determines whether the information acquisition means is permitted to operate or not, based on the location information attached to the access request information received by the second reception means, and, the transmission means is a second transmission means which sends, to the mobile device via the network, the access permission information, if determined by the propriety determination means that the information acquisition means is permitted to operate.

12. The information management system according to claim 11,
wherein the information management device further comprises:
a storage means which stores at least either permission zone information used for permitting access to the information acquisition means, or prohibition zone information used for prohibiting access to the information acquisition means, and, the propriety determination means determines whether the information acquisition means is permitted to operate or not, based on the location information attached to the access request information, referring to at least either the permission zone information or the prohibition zone information stored in the storage means.

13. The information management system according to claim 11,
wherein the control means refers to the access permission information received from the information management device via the network, to determine whether the prohibition of operation of the information acquisition means is unlocked or not, based on the location information acquired by the location information acquisition means, and controls the information acquisition means to operate based on the result of determination.

14. The information management system according to claim 9,
wherein the mobile device further comprises:
a transmission means which sends, via the network to the information management device, identification information which indicates the mobile device or the user of the mobile device,
the reception means receives, from the information management device via the network, the access permission information or the access prohibition information in response to the identification information, and
the control means controls the information acquisition means to operate, upon reception of the access permission information by the reception means.

15. The information management system according to claim 12,
wherein the mobile device further comprises a location information acquisition means which acquires location information for pointing a current location,
the transfer control means adds, when the information was acquired by the information acquisition means being operated, the location information acquired by the location information acquisition means to the information, and transfers them via the network to the information management device, and, the information management device further comprises an accessibility setting means which sets access permission/prohibition of the information, based on the location information attached to the information acquired by the information acquisition means, and sent from the mobile device, referring to at least either the permission zone information or the prohibition zone information stored in the storage means.

16. A non-transitory storage medium storing a program product recorded so as to be readable by a computer of a mobile device, the mobile device being connected via a network to an information management device, and being equipped with an information acquisition means and a location information acquisition means which acquires location information for pointing a current location of the mobile device,
the program product making the computer execute:
a location information acquisition process, acquiring location information for pointing a current location;
a sending process, sending access request information attached with the location information, used for requesting access to the information acquisition means, via the network to the information management device;
a reception process, receiving access permission information in response to the access request information, from the information management device via the network; and
a control process, leaving the information acquisition means prohibited to operate if the access permission information has not been received yet, and controlling the information acquisition means to operate upon reception of the access permission information;
a transfer control process, transferring the information acquired by allowing the information acquisition means to operate, via the network to the information management device; and
a step determining whether the acquired information was transferred to the information management device or not, and deleting the information having already been transferred, wherein
while the control means leaves the information acquisition means prohibited to operate,
the location information acquisition process, intermittently acquiring the location information, after the reception process received the access permission information, and
the control process, controlling the information acquisition means, having been prohibited to operate, so as to operate based on the location information and the access permission information, and, determines whether or not the mobile device has moved into a prohibition zone where the information acquisition means is inaccessible, based on the intermittently acquired location information and the access permission information, and terminates operation of the information acquisition means being operated, if determined that the mobile device has moved into the prohibition zone.

* * * * *